(12) United States Patent
Twigg et al.

(10) Patent No.: US 8,006,485 B2
(45) Date of Patent: Aug. 30, 2011

(54) COMPRESSION IGNITION ENGINE AND EXHAUST SYSTEM THEREFOR

(75) Inventors: Martyn Vincent Twigg, Cambridge (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 10/527,634

(22) PCT Filed: Sep. 15, 2003

(86) PCT No.: PCT/GB03/04002
§ 371 (c)(1),
(2), (4) Date: Oct. 7, 2005

(87) PCT Pub. No.: WO2004/025093
PCT Pub. Date: Mar. 25, 2004

(65) Prior Publication Data
US 2006/0156709 A1 Jul. 20, 2006

(30) Foreign Application Priority Data

Sep. 13, 2002 (GB) .................................. 0221228.0
Feb. 18, 2003 (GB) .................................. 0303660.5

(51) Int. Cl.
*F01N 3/00* (2006.01)
(52) U.S. Cl. ................ 60/295; 60/274; 60/285; 60/297; 60/303; 60/311
(58) Field of Classification Search ............... 60/274, 60/276, 278, 285, 286, 295, 297, 303; 422/169, 422/171, 177, 182; 502/304, 333, 334
See application file for complete search history.

(56) References Cited

U.S. PATENT DOCUMENTS

| 3,741,725 A | 6/1973 | Graham |
| 4,087,384 A * | 5/1978 | Davis ........................... 502/333 |
| 4,123,901 A * | 11/1978 | Masaki et al. .................. 60/277 |
| 4,153,579 A * | 5/1979 | Summers et al. ............. 502/304 |
| 4,189,405 A | 2/1980 | Knapton et al. |

(Continued)

FOREIGN PATENT DOCUMENTS

CA      1 162 054 A    2/1984
(Continued)

OTHER PUBLICATIONS

Yasushi Mase et al., "Nissan's New Multivalve DI Diesel Engine Series," SAE Technical Paper Series, Paper No. 981039, presented at the International Congress and Exposition, Detroit, Michigan, Feb. 23-26, 1998.

(Continued)

*Primary Examiner* — Tu M Nguyen
(74) *Attorney, Agent, or Firm* — RatnerPrestia (57) ABSTRACT

A system including a compression ignition engine operable in a first, normal running mode and operable in a second mode to produce an exhaust gas having an increased level of carbon monoxide (CO) relative to the exhaust gas produced in the first mode. The system, when in use, can switch engine operation between the two modes, and the system includes an exhaust system. The exhaust system includes a supported palladium (Pd) catalyst associated with at least one base metal promoter and an optionally supported platinum (Pt) catalyst associated with and/or downstream of the Pd catalyst wherein CO is oxidised by the supported Pd catalyst during second mode operation.

27 Claims, 1 Drawing Sheet

U.S. PATENT DOCUMENTS

| | | | |
|---|---|---|---|
| 4,686,827 A | | 8/1987 | Wade et al. |
| 4,900,517 A | * | 2/1990 | Domesle et al. ............... 60/299 |
| 5,335,492 A | | 8/1994 | Zirkel |
| 5,890,360 A | * | 4/1999 | Sasaki et al. ................... 60/278 |
| 6,253,543 B1 | * | 7/2001 | Russell .......................... 60/274 |
| 6,293,096 B1 | | 9/2001 | Khair et al. |
| 6,348,430 B1 | | 2/2002 | Lindner et al. |
| 6,375,910 B1 | * | 4/2002 | Deeba et al. ............... 423/239.1 |
| 6,555,081 B2 | | 4/2003 | Hori et al. |
| 6,564,545 B1 | | 5/2003 | Dong |
| 6,606,856 B1 | * | 8/2003 | Brown et al. .................. 60/299 |
| 6,679,052 B2 | * | 1/2004 | Nakatani et al. ............... 60/297 |
| 6,756,338 B2 | | 6/2004 | Koo et al. |
| 6,772,585 B2 | * | 8/2004 | Iihoshi et al. .................. 60/277 |
| 6,829,889 B2 | * | 12/2004 | Saito et al. ..................... 60/291 |
| 6,912,847 B2 | * | 7/2005 | Deeba ............................ 60/297 |
| 6,916,450 B2 | * | 7/2005 | Akama et al. ................. 422/180 |
| 6,978,603 B2 | * | 12/2005 | Asanuma ....................... 60/297 |
| 7,661,263 B2 | * | 2/2010 | Coleman et al. ............... 60/285 |
| 2002/0048542 A1 | | 4/2002 | Deeba et al. |
| 2002/0053202 A1 | | 5/2002 | Akama et al. |
| 2004/0065078 A1 | * | 4/2004 | Schafer-Sindlinger et al. ............................. 60/295 |
| 2006/0162317 A1 | | 7/2006 | Twigg et al. |

FOREIGN PATENT DOCUMENTS

| | | |
|---|---|---|
| DE | 41 17 364 A1 | 12/1992 |
| EP | 0 341 832 A2 | 11/1989 |
| EP | 0 560 991 A1 | 9/1993 |
| EP | 0 602 865 A1 | 6/1994 |
| EP | 0 613 714 A2 | 9/1994 |
| EP | 0 758 713 A1 | 2/1997 |
| EP | 0 786 284 A1 | 7/1997 |
| EP | 0 885 650 A2 | 12/1998 |
| EP | 0 885 650 A3 | 12/1998 |
| EP | 1 180 390 A1 | 2/2002 |
| GB | 2 290 488 A | 1/1996 |
| JP | 5-59937 | 3/1993 |
| JP | 7-251073 A | 10/1995 |
| JP | 8-14029 | 1/1996 |
| JP | 2002-045702 | 2/2002 |
| JP | 2002-129937 | 5/2002 |
| WO | WO-94/22564 | 10/1994 |
| WO | WO-95/00235 | 1/1995 |
| WO | WO 95/35152 | 12/1995 |
| WO | WO-96/39576 | 12/1996 |
| WO | WO-00/28196 | 5/2000 |
| WO | WO-00/29726 | 5/2000 |
| WO | WO-00/59611 | 10/2000 |
| WO | WO 01/14046 A1 | 3/2001 |
| WO | WO-01/74476 A1 | 10/2001 |
| WO | WO 02/26379 | 4/2002 |
| WO | WO 0226379 A1 * | 4/2002 |
| WO | WO 02/083301 A1 | 10/2002 |
| WO | WO-02/083301 A3 | 10/2002 |

OTHER PUBLICATIONS

Olof Erlandsson et al., "Hydrocarbon (HC) Reduction of Exhaust Gases from a Homogeneous Charge Compression Ignition (HCCI) Engine Using Different Catalytic Mesh-Coatings," *SAE Technical Paper Series*, Paper No. 2000-01-1847, presented at the SAE International Spring Fuels & Lubricants Meeting & Exposition; Paris, France; Jun. 19-22, 2000.

Magnus Christensen et al., "The Effect of Piston Topland Geometry on Emissions of Unburned Hydrocarbons from a Homogeneous Charge Compression Ignition (HCCI) Engine," *SAE Technical Paper Series*, Paper No. 2001-10-1893, presented at the SAE International Spring Fuels & Lubricants Meeting & Exposition; Orlando, Florida; May 7-9, 2001.

pp. 10-26 of Annex 1 to the Notica of Opposition to European Patent No. 1 537 304, owned by Johnson Matthey Public Limited Company, filed by Umicore AG & Co. KG on Nov. 28, 2007.

Heywood, John B., *Internal Combustion Engine Fundamentals*, McGraw-Hill, Apr. 1988, pp. 592-593.

Heck et al., *Catalytic Air Pollution Control: Commercial Technology* (New York: John Wiley & Sons, Inc., 1995), pp. 194-197.

Fisher et al., "Investigation of Catalytic Alternatives to Rhodium in Emissions Control," *SAE Technical Paper Series*, Paper No. 920846, presented at International Congress & Exposition, Detroit, Michigan, Feb. 1992.

Golunski et al., "Low Light-Off Catalyst Technololgy and Its Low Emission Vehicle Application," *SAE Technical Paper Series*, Paper No. 950408, presented at International Congress & Exposition, Detroit Michigan, Feb. 1995.

"Feature Analysis of Claims 1," from Opposition of Umicore AG & Co. KG to EP 1 537 304, filed Nov. 28, 2007.

* cited by examiner

COMPRESSION IGNITION ENGINE AND EXHAUST SYSTEM THEREFOR

This application is the U.S. national phase application of PCT International Application No. PCT/GB2003/004002, filed Sep. 15, 2003, and claims priority of British Patent Application No. 0221228.0, filed Sep. 13, 2002, and British Patent Application No. 0303660.5, filed Feb. 18, 2003.

The present invention relates to a compression ignition engine, such as a diesel engine, and an exhaust system therefor.

BACKGROUND OF THE INVENTION

Conventional compression ignition engines, such as diesel engines, produce less gaseous hydrocarbon (HC) and carbon monoxide (CO) than gasoline engines and it is possible to meet present legislated limits for these components using a platinum (Pt)-based diesel oxidation catalyst (DOC) disposed on a flow through honeycomb monolith. Diesel nitrogen oxide ($NO_x$) emissions are presently controlled by engine management, such as exhaust gas recirculation (EGR). As a consequence, however, diesel particulate matter (PM) emissions including volatile and soluble organic fractions (VOF and SOF respectively) of unburned hydrocarbons (HC) are increased. The DOC is used to treat VOF and SOF in order to meet presently legislated limits for PM.

However, as emission standards are tightened in forthcoming years, the challenge of the skilled engineer is how to meet them.

Devices for treating exhaust gases from compression ignition engines such as diesel engines to meet present and future emissions standards include the DOC, the CRT®, catalysed soot filters (CSF), $NO_x$ traps, lean $NO_x$ catalysts (LNC) (also known as hydrocarbon selective catalytic reduction (HC-SCR) catalysts or non-selective catalytic reduction (NSCR) catalysts) and selective catalytic reduction (SCR) catalysts, i.e. using $NO_x$-specific reactants such as ammonia or ammonia precursors e.g. urea.

An illustrative DOC composition for treating CO, HC and a VOF component of particulates in diesel exhaust is disclosed in WO 94/22564, which catalyst comprising ceria and a zeolite and optionally alumina carrying an optional dispersed metal component of Pt or palladium (Pd). Alternatively, or additionally, the zeolite is optionally doped, e.g. by ion-exchange, with inter alia Pt and/or Pd.

In our EP 0341832 we disclose a process for combusting diesel particulate deposited on a filter in nitrogen dioxide ($NO_2$) at up to 400° C., which $NO_2$ is obtained by oxidising nitrogen monoxide (NO) in the exhaust gas over a suitable catalyst disposed upstream of the filter. The NO oxidation catalyst can comprise a platinum group metal (PGM) such as Pt, Pd, ruthenium (Ru), rhodium (Rh) or combinations thereof, particularly Pt. The filter can be coated with material which facilitates higher temperature combustion such as a base metal catalyst, e.g. vanadium oxide, $La/Cs/V_2O_5$ or a precious metal catalyst. Such a system is marketed by Johnson Matthey as the CRT®.

WO 00/29726 discloses an apparatus for treating an exhaust gas stream, including diesel engine exhaust, which apparatus comprising a CSF comprising a first catalyst and a second catalyst in communication with the first catalyst. The first catalyst can comprise at least one first PGM including mixtures of PGM components; a first cerium component; and preferably a zirconium component. The second catalyst can comprise a second cerium component and optionally at least one second PGM. The second catalyst can be a separate catalytic element or part of the filter and is preferably designed for reducing diesel exhaust particulates emission by oxidation of the VOF thereof. None of the Examples describe a first or second catalyst comprising Pd.

A method of absorbing $NO_x$ from lean internal combustion engine exhaust gas on a $NO_x$ absorbent and intermittently reducing the oxygen concentration in the exhaust gas to release the absorbed $NO_x$ for reduction over a suitable catalyst with a reductant, thereby regenerating the $NO_x$ absorbent, is disclosed in EP 0560991.

A problem with such devices is that when the exhaust gas temperature is too low e.g. during extensive periods of idling or slow driving conditions, the catalysts in the devices are sub-optimally active. Consequently, emissions of legislated pollutants such as CO, HC and $NO_x$ increase and filters become loaded with PM. For example in the case of $NO_x$ traps, the NO oxidation catalyst has to be sufficiently hot that it can oxidise NO to $NO_2$ so that the $NO_2$ can be absorbed on a suitable $NO_x$ absorbent. In the use of CSF, the filter can be regenerated actively by combusting injected HC fuel thereon in order to raise the filter temperature to about 600° C. However, unless the filter is above about 250-300° C. prior to HC injection, the HC may not be combusted on the filter or combustion may be incomplete, thus leading to increased HC and CO emissions.

Measures for increasing the temperature in a system comprising a CRT® and a $NO_x$ trap are disclosed in EP 0758713.

A problem with prior art measures for increasing temperature in exhaust systems comprising DOC, the CRT®, CSF or $NO_x$ traps is that generally they result in an increased fuel penalty.

Two ways of reducing diesel emissions, which can be used in addition to exhaust gas aftertreatment, are engine management and engine design. More recently, a new generation of compression engines has been developed which uses a range of engine management techniques to lower the combustion temperature. Broadly, this new generation of engine can be defined as "an engine with compression ignition wherein substantially all of the fuel for combustion is injected into a combustion chamber prior to the start of combustion". An exhaust system for treating exhaust gas from such engines is the subject of a related application to the present application filed on the same date entitled "Process for treating compression ignition engine exhaust gas" claiming an earliest priority date of $13^{th}$ Sep. 2002. For the avoidance of doubt, the present application does not embrace the new generation of compression ignition engines as defined hereinabove.

Our EP 0602865 discloses a catalyst for oxidising CO to $CO_2$ in the exhaust gas of an internal combustion engine, which catalyst is composed of metal oxide particles among which are uniformly incorporated noble metal particles obtainable e.g. by co-precipitation. The metal oxide particles can be $CeO_2$ and the noble metal can be one or more of Pt, Pd, Rh and gold (Au).

Our WO 96/39576 discloses an internal combustion engine, such as a diesel engine, comprising an exhaust system comprising inter alia the CO oxidation catalyst disclosed in EP 0602865 for generating an exotherm from CO oxidation to light-off a HC oxidation catalyst following cold start. The engine is configured to produce increased levels of CO in the exhaust gas following cold start and the exhaust system preferably includes one or more of the following features for decreasing the CO light-off temperature: an HC trap and/or a water trap upstream of the CO oxidation catalyst; a water trap downstream of the CO oxidation catalyst; and CO catalyst drying means, such as a pump for passing dried ambient air over the CO oxidation catalyst prior to start-up.

DE 4117364 discloses a catalyst featuring an ancillary catalyst upstream of a main catalyst for lighting-off the main catalyst following cold start. The main catalyst is a 5Pt/1Rh three-way catalyst for treating stoichiometric gasoline exhaust gas. The ancillary catalyst is preferably Pt "which is outstanding for the oxidation of CO", but can also be the more expensive 5Pt/1Rh catalyst or Pd but "certainly Pd is less active than Pt".

JP 5-59937 describes a system for treating start-up exhaust gases from a gasoline engine including an HC trap upstream of a catalyst for oxidising CO for heating up a downstream exhaust purifying catalyst in a start-up strategy. The CO oxidation catalyst can be 0.5% $Pd/Al_2O_3$ which can be co-existent with the exhaust purifying catalyst, coated on an upstream side of a brick having the exhaust purifying catalyst on the downstream end or layered with the exhaust purifying catalyst. Engine management provides 6% peak CO at cold start falling to 1% CO after 20 seconds, but optionally can be kept at 3% CO until the exhaust purifying catalyst has warmed up, as necessary.

By "metal" herein, we mean the oxidic compound existing in the presence of the constituents of exhaust gas, although in use they may be present as the nitrate, carbonate or hydroxide.

We have investigated Pd catalysts for CO oxidation and have found that Pd catalysts are at least of zero order kinetics for CO for the reaction, i.e. the rate of reaction stays the same regardless of the CO concentration. We have also found that for certain promoted and supported Pd catalysts, the rate of reaction is first order for CO, i.e. the more CO, the faster the rate of reaction. By contrast, a widely used PGM in DOCs, platinum (Pt), can be negative order in CO, i.e. the more CO, the lower the reaction rate.

Furthermore, in tests we have found that our supported and promoted Pd catalysts can be better than Pt at catalysing the oxidation of certain saturated HCs.

We have now found a way of utilising our observations in an exhaust system of a compression ignition engine, such as a diesel engine, to further reduce overall emissions.

SUMMARY OF THE INVENTION

According to one aspect, the invention provides a compression ignition engine operable in a first, normal running mode and a second mode producing exhaust gas comprising an increased level of carbon monoxide (CO) relative to the first mode and means when in use to switch engine operation between the two modes, which engine comprising an exhaust system comprising a supported palladium (Pd) catalyst associated with at least one base metal promoter and an optionally supported platinum (Pt) catalyst associated with and/or downstream of the Pd catalyst wherein CO is oxidised by the supported Pd catalyst during second mode operation.

An advantage of the present invention is that we have found that an exhaust system comprising both Pt and Pd is more effective at treating saturated and unsaturated HCs during normal running conditions, i.e. at exhaust gas temperatures wherein the Pt and/or Pd catalyst is above the light-off temperature for HC oxidation. Furthermore, when the temperature of the Pt catalyst is below its light-off temperature for catalysing the oxidation of HC, e.g. below about 250° C., the concentration of CO in the exhaust gas can be increased by switching to second mode operation so that an exotherm developed over the Pd catalyst can heat the Pt catalyst to above its HC light-off temperature. Indeed we believe that our results show a synergistic relationship exists in the combined use of Pd and Pt catalysts for treating compression ignition exhaust gases according to the present invention.

DETAILED DESCRIPTION OF THE INVENTION

According to one embodiment, the engine is configured to produce >2000 ppm CO, such as >2500-10000 ppm CO e.g. >3000 ppm CO, >4000 ppm CO, >5000 ppm CO, >6000 ppm CO, >7000 ppm CO, >8000 ppm CO or >9000 ppm CO, when running in the second mode.

Second mode running can be done in conventional direct injection diesel engines by injecting HC into the exhaust gas downstream of the engine and upstream of a partial oxidation e.g. ceria-, nickel- or Rh-based catalyst; adjusting the ignition timing of at least one engine cylinder; and/or adjusting the engine air-to-fuel ratio of at least one engine cylinder. Such techniques are known for intermittently controlling engine exhaust gas composition to the lambda <1 side for regenerating $NO_x$ absorbers during normal lean running operation. In addition to increasing CO in the exhaust gas by combusting additional HC, unburned HC content in the exhaust gas can also increase. However, we understand that engine management techniques enable the skilled engineer to increase CO in the exhaust gas without substantially increasing the amount of unburned HC in the exhaust gas. CO content of the exhaust gas in the second mode condition can be modulated according to exotherm requirement by suitable engine control using methods known in the art, suitably programmed into a processor e.g. a central processor unit (CPU) and forming part of the engine control unit (ECU).

In one embodiment, the means for switching between the two modes switches between the first mode and the second mode when the Pt catalyst is <250° C., e.g. less than 200° C. or less than 150° C.

Switching to second mode running can be done intermittently to provide a "spike" concentration of CO. In certain embodiments, e.g. embodiments comprising a filter, it may be desirable to switch to second mode running "a little and often" to ensure filter regeneration. One such strategy can comprise switching to second mode running for between 10 seconds to 10 minutes, which period comprising a series of pulses of increased CO in the exhaust gas of from 250 milliseconds to 5 seconds in duration. Such a strategy prevents or reduces driveability issues.

The switching means can be controlled in response to exhaust gas or catalyst bed temperature. Alternatively, or in addition, it can be controlled in response to at least one measurable parameter indicative of the condition of the engine, such as: mass flow of exhaust gas in the system; manifold vacuum; ignition timing; engine speed; throttle position (accelerator position); the lambda value of the exhaust gas; the quantity of fuel injected in the engine; the position of the exhaust gas recirculation (EGR) valve and thereby the amount of EGR; boost pressure; and engine coolant temperature. Sensors for measuring all these parameters are known to the skilled person.

It is known that present diesel engines can produce exhaust gas comprising >2000 ppm CO under certain operating conditions, e.g. at cold start as part of a warm-up strategy or following hard acceleration. For the avoidance of doubt, the second mode of the present invention does not embrace an engine mode that is part of a start-up strategy or accidental i.e. unintentional increases in exhaust gas CO concentration caused e.g. by hard acceleration.

Furthermore, the range >2000 ppm CO is not chosen arbitrarily, but because we have found that in exhaust gases from compression ignition engines, such as diesel engines, this range approximates an interface between the rate of CO oxidation over the promoted and supported Pd catalysts of the present invention and conventional Pt catalysts.

In one embodiment, the exhaust system comprises a catalytic converter comprising a first substrate, which first substrate comprising the supported Pd and the associated at least one base metal promoter. In one embodiment comprising a first substrate, the supported Pd and the associated at least one base metal promoter are disposed on an upstream part of the substrate and the Pt catalyst on a downstream part thereof. In another embodiment, the first substrate comprises a first layer comprising the Pt catalyst and a second layer overlying the first layer, which second layer comprising the supported Pd and the associated at least one base metal promoter. According to a further embodiment, the first substrate is coated with a single washcoat layer, which layer comprising the supported Pd, the associated at least one base metal promoter and the Pt catalyst, wherein the Pd catalyst and the Pt catalyst are each supported on a separate and distinct particulate support material. Alternatively, the Pd catalyst and the Pt catalyst can be disposed on the same support.

In an alternative embodiment also comprising a first substrate, the catalytic converter comprises a second substrate downstream of the first substrate, which second substrate comprising the Pt catalyst.

Figure 1:
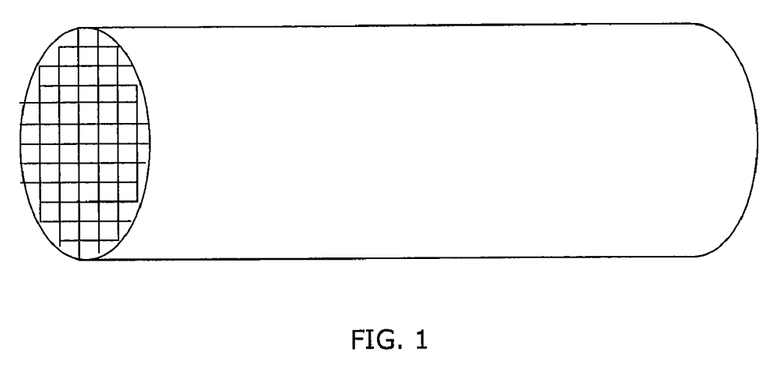
FIG. 1 shows a flow through substrate monolith in accordance with the present invention.
Figure 2:
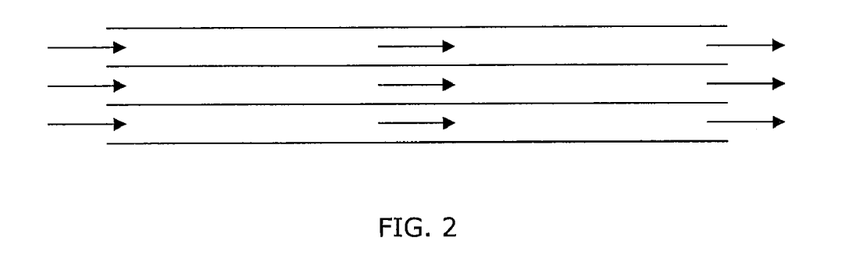
FIG. 2 shows a longitudinal cross-sectional view of the flow through substrate monolith of FIG. 1.

The catalytic converter can comprise a conventional substrate, such as a ceramic, e.g. cordierite, or metal, e.g. Fecralloy™, flow through honeycomb. Alternatively, the first substrate, where present, the second substrate or the first and second substrates comprise a particulate filter, wherein where the first and second substrates are different, the non-filter substrate can be e.g. a flow through honeycomb substrate. FIGS. 1 and 2 show an exemplary flow through, non-filtered substrate monolith, including flow arrows to show the direction of gaseous flow. The catalyst can be coated on a downstream end of a filter if desired.

Embodiments comprising filters comprise the CRT®, CSF and four-way catalyst (FWC) (see below).

At temperatures above about 250° C., NO is oxidised to $NO_2$ and the PM is combusted in the $NO_2$ at temperatures of up to about 400° C. This process is described in our EP 0341832. However, at low temperatures, the Pt can be below its light-off temperature for NO oxidation and so the performance of the process disclosed in EP 0341832 can be slower than desired because there is insufficient $NO_2$ in the exhaust gas entering the filter. When the exhaust gas temperature is below a temperature at which NO is oxidised to $NO_2$ effectively to regenerate the filter, an exotherm can be generated by combusting the CO produced during second mode running over the Pd catalyst, thus heating an associated Pt catalyst to above the NO light-off temperature and promoting the combustion of soot on the filter in $NO_2$. We have found that in order to retain optimum NO oxidation capability, the formation of Pt/Pd alloys should be prevented. Accordingly, it is preferred to dispose the Pt and the Pd on different supports. In the CRT® embodiment, the filter can be catalysed e.g. with a $La/Cs/V_2O_5$ catalysts or a noble metal, or be uncatalysed.

In an embodiment comprising a CSF, the Pt catalyst can be on the filter and the Pd catalyst and optionally also a Pt catalyst can be disposed on a first substrate, e.g. a flow through monolith, upstream of the filter. Alternatively, the Pd and the Pt catalysts can be on the filter, optionally the Pd disposed on the inlet end thereof. Intermittent switching to second mode running can provide a readily available exotherm to regenerate the filter.

In a further embodiment, the exhaust system comprises a catalyst for catalysing the selective catalytic reduction (SCR) of $NO_x$ with at least one $NO_x$-specific reactant disposed downstream of the supported Pd catalyst. Switching between first, and second mode running, thereby to promote an exotherm for heating the SCR catalyst downstream, can be done in order to maintain the SCR catalyst at or around its optimum temperature range for $NO_x$ reduction.

The SCR catalyst can comprise the Pt catalyst. Alternatively the SCR catalyst can be vanadium-based, e.g. $V_2O_5/TiO_2$; or a zeolite, e.g. ZSM-5, mordenite, gamma-zeolite or beta-zeolite. The zeolite can comprise at least one metal selected from the group consisting of Cu, Ce, Fe and Pt, which metal can be ion-exchanged or impregnated on the zeolite.

In order to provide a suitable source of reductant, the exhaust system can comprise means for introducing at least one $NO_x$-specific reactant, such as a nitrogenous compound, for example a nitrogen hydride, ammonia, an ammonia precursor, e.g. urea, ammonium carbamate and hydrazine, into the exhaust system upstream of the SCR catalyst.

In a further embodiment, exotherm production over the Pd catalyst from switching to second mode running can be used to heat a downstream catalyst for catalysing the reduction of $NO_x$ with at least one non-selective reactant, such as $H_2$ or at least one HC reductant. In one embodiment, the $NO_x$ reduction catalyst can comprise the Pt catalyst.

According to a further embodiment, the exhaust system, the first substrate, where present, the second substrate or the first and second substrates comprise a $NO_x$ absorber for absorbing $NO_x$ in lambda >1 exhaust gas. Such a device is generally used in combination with periodic air-fuel ratio enrichment during normal lean running conditions in order intermittently to regenerate the $NO_x$ absorber and reduce the $NO_x$ to $N_2$. $NO_x$ absorbers for use in such applications typically comprise at least one alkali metal, at least one alkaline earth metal, at least one rare earth metal or any two or more thereof, wherein the at least one alkali metal is e.g. potassium or caesium; the at least one alkaline earth metal can be selected from calcium, barium or strontium; and the at least one rare earth metal can be lanthanum or yttrium, as described in EP 0560991.

In order effectively to absorb $NO_x$ in the exhaust gas in the $NO_x$ absorber, it is generally understood that NO in the exhaust gas should first be oxidised to $NO_2$. Such oxidation can be performed by the Pt and Pd catalysts. In the present embodiment, the Pd catalyst can be on or upstream of a flow through substrate comprising the $NO_x$ absorber. The Pt catalyst can be with the Pd catalyst and/or downstream of it. However, for similar reasons to those mentioned above, to prevent any reduction in NO oxidation activity it is preferred to support the Pd and Pt catalysts on separate supports. In a particular embodiment, the $NO_x$ absorber includes both Pt and Rh, the latter for catalysing $NO_x$ reduction to $N_2$, although the Rh can be disposed downstream of the $NO_x$ absorber.

In order to regenerate a $NO_x$ absorber, typically $O_2$ composition in the exhaust gas is about 3%. $NO_x$ absorber regeneration is limited to bed temperatures of above about 200° C., because HC combustion is limited in the low $O_2$ concentration. By switching to second mode running, it is possible to increase the bed temperature in the $NO_x$ absorber to enable it to be regenerated normally.

It will be appreciated that alkaline earth metals and rare earth metals (such as a support impregnated with Ce) are sometimes used in the art of $NO_x$ absorbers as a $NO_x$ absorbent, whereas it is used in the present invention as a promoter for the Pd catalyst. For the avoidance of doubt therefore, in embodiments utilising $NO_x$ absorbents we make no claim to alkaline earth metal, praseodymium, lanthanum or impregnated cerium as a promoter where the Pd is associated with e.g. on the same flow through monolith as the $NO_x$ absorber. Of course, there is no accidental anticipation wherein these promoters are associated with the Pd disposed upstream of the intended $NO_x$ absorber composition.

In a further embodiment known as a FWC, the exhaust system comprises a filter for PM comprising a $NO_x$ absorber for absorbing $NO_x$ in lambda >1 exhaust gas and the Pt catalyst and optionally also the Pd catalyst. Of course, in addition, the Pd catalyst and optionally a Pt catalyst can be disposed upstream of the filter for producing an exotherm thereby to regenerate the filter and the $NO_x$ absorber, the latter in combination with appropriate air-fuel ratio modulation. In a particular embodiment, the $NO_x$ absorber includes both Pt and Rh, the latter for catalysing $NO_x$ reduction to $N_2$, although the Rh can be disposed downstream of the $NO_x$ absorber.

The exotherm generated over the Pd catalyst can be used also to de-sulphate exhaust gas treatment components in an exhaust system such as a diesel oxidation catalyst or a $NO_x$ absorber. Alternative uses are to de-coke exhaust system components such as an exhaust gas recirculation valve or a downstream catalyst.

Where the engine according to the invention includes an exhaust gas recirculation valve and a circuit to recirculate a selected portion of the exhaust gas to the engine air intake, desirably the exhaust gas is cooled prior to mixing with the engine intake air.

The at least one base metal promoter for the Pd catalytic component can be a reducible oxide or a basic metal or any mixture of any two or more thereof. Illustrative examples of reducible oxides are at least one of manganese, iron, tin, copper, cobalt and cerium, such as at least one of $MnO_2$, $Mn_2O_3$, $Fe_2O_3$, $SnO_2$, CuO, CoO and $CeO_2$. The reducible oxide can be dispersed on a suitable support and/or the support per se can comprise particulate bulk reducible oxide. An advantage of $CeO_2$ is that it is relatively thermally stable, but it is susceptible to sulfur poisoning. Manganese oxides are not as thermally stable, but they are more resistant to sulfur poisoning. Manganese oxide thermal stability can be improved by combining it in a composite oxide or mixed oxide with a stabiliser, such as zirconium. To some extent, ceria can be made more sulfur tolerant by forming a composite oxide or a mixed oxide with a suitable stabiliser, such as zirconium.

By "reducible oxide" herein, we mean that an oxide is present in situ wherein the metal has more than one oxidation state. In manufacture, the metal can be introduced as a non-oxide compound and oxidised by calcinations to the reducible oxide.

The basic metal can be an alkali metal, e.g. potassium, sodium or caesium, an alkaline earth metal, such as barium, magnesium, calcium or strontium, or a lanthanide metal, e.g. cerium, praseodymium or lanthanum, or any mixture, composite oxide or mixed oxide of any two or more thereof. In systems comprising two or more basic metal promoters, it is desirable to prevent interaction between the basic metals. Accordingly, it is preferred that no more than 3 wt % of the Pd catalyst comprises basic metal promoter.

In one embodiment, the basic metal is ceria, and the Pd is supported on particulate ceria, i.e. the particulate ceria serves as the Pd support and promoter.

Alternatively, the support for the or each PGM can be any conventional support known in the art such as alumina, magnesia, silica-alumina, titania, zirconia, a zeolite or a mixture, composite oxide or mixed oxide of any two or more thereof, and can be doped, as conventional in the art, with a basic metal. Non-limiting examples of the basic metal dopants are zirconium, lanthanum, alumina, yttrium, praseodymium, cerium, barium and neodymium. The support can be, for example, lanthanum-stabilised alumina, or a composite oxide or a mixed oxide comprising ceria and zirconia, optionally in a weight ratio of from 5:95 to 95:5.

"Composite oxide" as defined herein means a largely amorphous oxide material comprising oxides of at least two elements which are not true mixed oxides consisting of the at least two elements.

Suitable mixed oxides and composite oxides for the present invention may be prepared by conventional means, namely co-precipitation. For example, solutions of soluble salts of the metals may be mixed in the appropriate concentrations and amounts to yield the desired end product, then caused to precipitate concurrently, for example by adding a base such as ammonium hydroxide. Alternatively, other preparative routes utilising generally known technology, such as sol/gel or gel precipitation, have been found suitable. The precipitated oxides as slurries may be filtered, washed to remove residual ions, dried, then fired or calcined at elevated temperatures (>450° C.) in air.

A 85Mn:15Zr composite oxide material can be prepared as follows. Manganese nitrate (121.76 g, 0.425 mol) and aluminium nitrate (28.14 g, 0.075 mol) are dissolved in demineralised water to give 400 ml of solution. This solution was added carefully over two minutes to an overhead stirred ammonia solution (150 ml, 2.25 mol diluted to 500 ml). The precipitate slurry was stirred for five minutes and then allowed to 'age' for thirty minutes. The precipitate was recovered by filtration and washed until the conductivity of the filtrate was 1500 $\mu Scm^{-1}$. The material was dried at 100° C. and then fired at 350° C. for two hours (ramp up and down 10° C./min).

The catalyst can contain from 0.1 to 30% by weight of PGM based on the total weight of the catalyst. In one embodiment, the catalyst contains a weight ratio of from 95:5 to 10:90 Pd:Pt. In a further embodiment, the catalyst contains from 0.1 to 10% Pt by weight based on the total weight of the catalyst and from 0.1 to 20% by weight based on the total weight of the catalyst. According to a further embodiment, the exhaust system comprises from 30-300 $g/ft^3$ Pd and from 30-300 $g/ft^3$ Pt.

According to a further aspect, the invention provides a vehicle including a diesel engine according to the invention. The vehicle can be, for example, a light duty diesel vehicle as defined by relevant legislation.

According to a further aspect, the invention provides a process for operating a compression ignition engine comprising an exhaust system comprising a supported palladium (Pd) catalyst associated with at least one base metal promoter and an optionally supported platinum (Pt) catalyst associated with and/or downstream of the Pd catalyst, which process comprising running the engine in a first, normal running mode and switching the engine to a second running mode producing exhaust gas comprising an increased level of carbon monoxide (CO) relative to the first mode wherein the CO is oxidised by the supported Pd catalyst during second mode operation, which switching step being effected when a value of at least one measurable parameter indicative of a condition of the engine is within outside a pre-determined range.

According to another aspect, the invention provides a method of increasing the rate of a reaction catalysed by an optionally supported platinum (Pt) catalyst in an exhaust gas of a compression ignition engine, which method comprising the step of increasing the level of carbon monoxide (CO) in the exhaust gas and creating an exotherm to heat the Pt catalyst by oxidising the CO over a supported palladium (Pd) catalyst associated with at least one base metal promoter, wherein the optionally supported Pt catalyst is associated with and/or downstream of the Pd catalyst.

EXAMPLES

In order that the invention may be more fully understood reference is made to the following Examples by way of illustration only. All temperatures given refer to inlet gas temperatures.

Example 1

A 2 wt % Pt-alumina-based catalyst (Catalyst A), a 2 wt % Pd-alumina-based catalyst (Catalyst B), and a 2 wt % Pd-ceria-containing catalyst (Catalyst C) were tested for HC and CO light-off in a simulated catalyst activity test (SCAT) gas rig. A sample of each catalyst was tested in the flowing gas mixtures set out in Table 1. The temperature of the gas mixtures used was increased during each test from 100° C. to 500° C.

TABLE 1

Gas mixtures used for activity tests for Catalysts A, B, and C

|  | Gas Mixture 1 | Gas Mixture 2 | Gas Mixture 3 | Gas Mixture 4 |
|---|---|---|---|---|
| ppm HC (C1) as propene | 600 | 900 | 3000 | 3000 |
| ppm CO | 200 | 600 | 25000 | 25000 |
| ppm NO | 200 | 200 | 200 | 200 |
| % $H_2O$ | 4.5 | 4.5 | 4.5 | 4.5 |
| % $O_2$ | 12 | 12 | 12 | 3 |
| % $CO_2$ | 4.5 | 4.5 | 4.5 | 4.5 |
| ppm $SO_2$ | 20 | 20 | 20 | 20 |
| $N_2$ | Balance | Balance | Balance | Balance |
| Flow Rate (litres/hour/g sample) | 300 | 300 | 300 | 300 |
| Ramp Rate (° C./min) | 10 | 10 | 10 | 10 |

Gas mixtures 1 and 2 have HC and CO gas concentrations as typical of exhaust gases from a conventionally operated Diesel engine. Gas mixture 3 has higher HC and CO concentrations than gas mixtures 1 and 2 and gas mixture 4 has a lower oxygen concentration than used in gas mixtures 1 to 3. Tables 2 and 3 show the temperature at which 80% oxidation conversion of HC and CO was achieved over each catalyst.

TABLE 2

Temperature for 80% conversion (T80 HC/CO) of Catalysts A, B and C in gas mixtures 1–3.

| T80 HC/CO (° C.) | Gas Mixture 1 | Gas Mixture 2 | Gas Mixture 3 |
|---|---|---|---|
| Catalyst A | 170/<110 | 158/114 | 185/183 |
| Catalyst B | 264/265 | 253/247 | 205/203 |
| Catalyst C | 231/164 | 226/170 | <110/<110 |

Catalyst A showed significantly higher activity than Catalyst B or C at lower temperatures for both HC and CO oxidation using the gas mixtures 1 and 2, but showed a loss in low temperature oxidation activity in the high HC and CO gas mixture 3. In contrast to the loss in activity in high HC, CO gas feeds for Catalyst A, Catalyst B showed a small improvement in low temperature oxidation activity from gas mixture 1 or 2 to gas mixture 3. However, despite the improved low temperature activity of Catalyst B for the higher HC and CO gas feed conditions, overall the activity of Catalyst B was poorer than that of Catalyst A. By contrast, Catalyst C showed lower activity under gas mixtures 1 and 2 relative to Catalyst A. However, in contrast to Catalyst A and Catalyst B, Catalyst C showed the highest activity for HC and CO oxidation at low temperatures under the high HC and CO gas concentration mixture 3.

Table 3 shows that the low temperature CO activity of Catalyst A was further decreased in gas mixture 4, consisting of 3% oxygen, compared to the activity measured in gas mixture 3, which included 12% oxygen. In contrast, the activity of Catalyst B was slightly improved in gas mixture 4 compared to gas mixture 3. The low temperature oxidation activity of Catalyst C remained very high in both gas mixtures 3 and 4. The data show that Pd is more active in presence of CO than Pt.

TABLE 3

Temperature for 80% conversion (T80-CO) of Catalysts A, B and C in gas mixtures 3 and 4.

| T80 CO (° C.) | Mixture 3 | Mixture 4 |
|---|---|---|
| Catalyst A | 183 | 239 |
| Catalyst B | 203 | 197 |
| Catalyst C | <110 | <110 |

Example 2

In another series of activity tests, Catalyst D (1 wt % Pt-alumina-based), and Catalyst E (4 wt % Pd-ceria-based), were tested for HC and CO light-off in a SCAT gas rig using the gas mixtures set out in Table 4, and the temperature of the gas passed over each sample was increased during each test from 100° C. to 500° C.

TABLE 4

Gas mixtures used for activity tests of Catalysts D and E.

|  | Gas Mixture 5 | Gas Mixture 6 | Gas Mixture 7 | Gas Mixture 8 | Gas Mixture 9 |
|---|---|---|---|---|---|
| ppm HC (C1) as toluene | 600 | 600 | 600 | 600 | 600 |
| ppm CO | 200 | 950 | 2000 | 10000 | 25000 |
| ppm NO | 200 | 200 | 200 | 200 | 200 |
| % $H_2O$ | 4.5 | 4.5 | 4.5 | 4.5 | 4.5 |
| % $O_2$ | 12 | 12 | 12 | 12 | 12 |
| % $CO_2$ | 4.5 | 4.5 | 4.5 | 4.5 | 4.5 |
| ppm $SO_2$ | 20 | 20 | 20 | 20 | 20 |
| $N_2$ | Balance | Balance | Balance | Balance | Balance |
| Flow Rate (litres/hour/g sample) | 300 | 300 | 300 | 300 | 300 |
| Ramp Rate (° C./min) | 10 | 10 | 10 | 10 | 10 |

For each gas mixture from 5 to 9, the CO concentration was progressively increased and the remaining gases were kept constant with a nitrogen balance. Table 5 shows the effect of CO concentration on the HC and CO light-off of the catalysts.

TABLE 5

Temperature for 80% conversion (T80-HC/CO) of Catalysts D and E in gas mixtures 5–9.

| T80 HC/CO (° C.) | Gas Mixture 5 | Gas Mixture 6 | Gas Mixture 7 | Gas Mixture 8 | Gas Mixture 9 |
|---|---|---|---|---|---|
| Catalyst D | 188/112 | 192/158 | 194/185 | 212/210 | 231/217 |
| Catalyst E | 259/135 | 256/130 | 175/<110 | <110/<110 | <110/<110 |

Catalyst D showed a loss in low temperature activity as the CO concentration was progressively increased, whereas Catalyst E showed improved low temperature activity with higher CO gas feeds. We infer that the loss in activity for Catalyst D is because of self-poisoning of the active sites on the catalyst. It is well known that the strong adsorption of CO on the Pt active sites may block the adsorption of oxygen necessary for the oxidative reaction to form $CO_2$. Catalyst E does not show this self-poisoning behaviour, and the activity of this catalyst to oxidise CO in higher CO concentrations is significantly improved over Catalysts A and D.

Example 3

Further SCAT rigs tests on Catalyst D (1 wt % Pt-alumina-based) and Catalyst E (4 wt % Pd-ceria-based) were carried out using the gas mixtures with 25000 ppm CO and two different HC concentrations (using either propene or toluene). A sample of each catalyst was placed in the gas mixtures shown in Table 6, and the temperature of the gas was increased from 100° C. to 500° C. The concentration of HC (as C1) was increased from 600 ppm to 3000 ppm using either propene or toluene as the HC species. The activity of the catalysts tested is given in Table 7.

TABLE 6

Gas mixtures used for activity tests on Catalyst A and Catalyst C.

| | Gas Mixture 10 | Gas Mixture 11 | Gas Mixture 12 | Gas Mixture 13 |
|---|---|---|---|---|
| ppm HC (C1) as propene | 600 | 3000 | 0 | 0 |
| ppm HC (C1) as toluene | 0 | 0 | 600 | 3000 |
| ppm CO | 25000 | 25000 | 25000 | 25000 |
| ppm NO | 200 | 200 | 200 | 200 |
| % $H_2O$ | 4.5 | 4.5 | 4.5 | 4.5 |
| % $O_2$ | 12 | 12 | 12 | 12 |
| % $CO_2$ | 4.5 | 4.5 | 4.5 | 4.5 |
| ppm $SO_2$ | 20 | 20 | 20 | 20 |
| $N_2$ | Balance | Balance | Balance | Balance |
| Flow Rate (litres/hour/g sample) | 300 | 300 | 300 | 300 |
| Ramp Rate (° C./min) | 10 | 10 | 10 | 10 |

TABLE 7

Temperature for 80% conversion (T80-CO/HC) of catalysts D and E in gas mixtures 10–13.

| T80 HC/CO (° C.) | Gas Mixture 10 | Gas Mixture 11 | Gas Mixture 12 | Gas Mixture 13 |
|---|---|---|---|---|
| Catalyst D | 186/184 | 218/218 | 231/217 | 230/231 |
| Catalyst E | <110/<110 | <110/<110 | <110/<110 | <110/<110 |

For gas mixtures 10 and 12 (containing 25000 ppm CO, 600 ppm HC), Catalyst E showed the highest activity for HC and CO light-off. The light-off activity of Catalyst D deteriorated in gas mixtures 11 and 13 (containing 25000 ppm CO, 3000 ppm HC) relative to the activity found for gas mixtures 10 or 12. The activity of Catalyst E in all the gas mixtures used remained higher than that of Catalyst D.

Example 4

Further SCAT rig tests on Catalyst A, Catalyst B, and Catalyst C were carried out using gas mixtures with 10000 ppm CO and four different HC concentrations (using propene). A sample of each catalyst was tested in the gas mixtures in Table 8, and the temperature of the gas was increased from 100° C. to 500° C. The concentration of HC (as C1) was increased from 600 ppm to 4500 ppm (propene). The activity of the catalysts is shown in Table 9.

TABLE 8

Gas mixtures used for activity tests of Catalysts A, B and Catalyst C.

| | Gas Mixture 14 | Gas Mixture 15 | Gas Mixture 16 | Gas Mixture 17 |
|---|---|---|---|---|
| ppm HC (C1) as propene | 600 | 1800 | 3000 | 4500 |
| ppm CO | 10000 | 10000 | 10000 | 10000 |
| ppm NO | 200 | 200 | 200 | 200 |
| % $H_2O$ | 4.5 | 4.5 | 4.5 | 4.5 |
| % $O_2$ | 12 | 12 | 12 | 12 |
| % $CO_2$ | 4.5 | 4.5 | 4.5 | 4.5 |
| ppm $SO_2$ | 20 | 20 | 20 | 20 |
| $N_2$ | Balance | Balance | Balance | Balance |
| Flow Rate (litres/hour/g sample) | 300 | 300 | 300 | 300 |
| Ramp Rate (° C./min) | 10 | 10 | 10 | 10 |

TABLE 9

Temperature for 80% conversion (T80-CO/HC) of Catalysts A, B and C in gas mixtures 14–17.

| $C_3H_6$ ppm | Catalyst A CO $T_{80}$ | Catalyst A $C_3H_6$ $T_{50}$ | Catalyst B CO $T_{80}$ | Catalyst B $C_3H_6$ $T_{50}$ | Catalyst C CO $T_{80}$ | Catalyst C $C_3H_6$ $T_{50}$ |
|---|---|---|---|---|---|---|
| 600 | 159 | 156 | 169 | 176 | 121 | <110 |
| 1800 | 159 | 165 | 179 | 177 | 130 | 134 |
| 3000 | 161 | 162 | 179 | 177 | 136 | 135 |
| 4500 | 161 | 170 | 180 | 179 | 133 | 142 |

Catalyst C exhibits the highest activity for HC and CO oxidation in the gas feed that contained 600 ppm HC. Catalyst B had the poorest activity. Increased levels of HC caused a slight drop in catalyst activity, but even at the highest HC levels Catalyst C had much lower temperature activity for oxidation light-off compared to Catalysts A and B.

Example 5

A further series of SCAT tests with Catalyst C (2 wt % Pd-ceria), Catalyst F (2.5 wt % Pt-alumina-based) and Catalyst G (1.25 wt % Pt/1 wt % Pd—which is a mixture of Catalyst C and Catalyst F) were conducted using gas mixtures with 1% CO and three different HC species at 1000 ppm (C3) concentration. The test procedure was as described previously and the gas mixtures are shown in Table 10. The activity of the catalysts tested is given in Table 11.

TABLE 10

Gas mixtures used for activity tests on Catalysts C, F & G.

|  | Gas Mixture 18 | Gas Mixture 19 | Gas Mixture 20 |
|---|---|---|---|
| ppm HC (C3) |  |  |  |
| as propene | 1000 | 0 | 0 |
| as ethene | 0 | 1000 | 0 |
| as ethane | 0 | 0 | 1000 |
| ppm CO | 10,000 | 10,000 | 10,000 |
| ppm NO | 200 | 200 | 200 |
| % $H_2O$ | 4.5 | 4.5 | 4.5 |
| % $O_2$ | 12 | 12 | 12 |
| % $CO_2$ | 4.5 | 4.5 | 4.5 |
| ppm $SO_2$ | 20 | 20 | 20 |
| $N_2$ | Balance | Balance | Balance |
| Flow Rate (litres/hour/g sample) | 300 | 300 | 300 |
| Ramp Rate (° C./min) | 10 | 10 | 10 |

TABLE 11

Temperature for 80% and 50% conversion (CO/HC) of Catalysts C, F, and G in gas mixtures 18, 19 and 20.

| HC Species | Catalyst C | | Catalyst F | | Catalyst G | |
|---|---|---|---|---|---|---|
|  | $CO_{T80}$ | $HC_{T50}$ | $CO_{T80}$ | $HC_{T50}$ | $CO_{T80}$ | $HC_{T50}$ |
| $C_3H_6$ | 136 | 135 | 161 | 162 | 137 | 139 |
| $C_2H_4$ | <110 | 186 | 160 | 167 | 129 | 127 |
| $C_2H_6$ | <110 | 367 | 159 | 301 | 137 | 303 |

Whilst Catalyst C remains highly effective for CO oxidation at low temperature, Catalyst F remains more effective for small chain HC oxidation except for propene. The mixed system Catalyst G showed good CO activity with not dissimilar activity to Catalyst C. Catalyst G showed equivalent propene light off to Catalyst C and considerably lower light off for ethene and ethane, demonstrating the strong synergistic effect achieved by combining both catalyst formulations.

Example 6

The effect of other metal supports was assessed for comparison with Catalyst A (2 wt % Pd—$Al_2O_3$) and Catalyst C (2 wt % Pd—Ce) in gas mixture 3 (high CO and HC concentrations) and gas mixture 21 (low CO and HC concentrations). Additional catalysts evaluated were Catalyst H (2 wt % Pd—Mn Oxide), Catalyst I (2 wt % Pd—Mn:Zr [85.15]) and Catalyst J (2 wt % Pd-20% Ba/$Al_2O_3$). The test procedure was as before and gas mixtures are shown in Table 12, with catalyst activity summarised in Table 13.

TABLE 12

Gas mixtures used for activity tests on Catalyst A, C, H, I, and J.

|  | Gas Mixture 21 | Gas Mixture 3 |
|---|---|---|
| ppmHC (C1) as propene | 900 | 3000 |
| ppm CO | 1000 | 25000 |
| ppm NO | 200 | 200 |
| % $H_2O$ | 4.5 | 4.5 |
| % $O_2$ | 12 | 12 |
| % $CO_2$ | 4.5 | 4.5 |
| ppm $SO_2$ | 20 | 20 |
| $N_2$ | Balance | Balance |
| Flow Rate (litres/hour/g sample) | 300 | 300 |
| Ramp Rate (° C./min) | 10 | 10 |

TABLE 13

Temperature for 80% and 50% conversion (CO/HC) of Catalysts A, C, H, I and J in gas mixtures 3 and 21.

|  | Gas Mixture 21 | | Gas Mixture 3 | |
|---|---|---|---|---|
| Catalyst | $CO\ T_{80}$ | $HC\ T_{50}$ | $CO\ T_{80}$ | $HC\ T_{50}$ |
| A | 230 | 230 | 183 | 176 |
| C | 175 | 200 | <110 | <110 |
| H | <110 | 159 | <110 | <110 |
| I | 152 | 189 | <110 | <110 |
| J | 202 | 211 | 167 | 160 |

Both Mn containing catalysts H and I show equivalent performance to Catalyst C with high CO concentrations but also lower light off with low CO concentrations. Addition of Ba (Catalyst J) shows improved performance with high CO compared to low CO concentration and has superior activity compared to Catalyst A.

Example 7

A 1.9 liter, common rail, direct injection, turbo charged, diesel vehicle certified for European Stage 3 legislative requirements, and fuelled with <10 ppm sulphur-containing diesel fuel, was fitted with ceramic supported catalysts 4.66 in (118 mm) diameter and 6 in (152 mm) long. Catalyst K was coated with platinum catalyst at 140 g $ft^3$ (4.85 g $liter^{-1}$) and Catalyst L was coated with platinum catalyst at 70 $gft^{-3}$ (2.43 g $liter^{-1}$) and palladium-ceria catalyst at a palladium loading of 70 $gft^{-3}$ (2.43 g $liter^{-1}$). Before testing, the catalysts were aged for 5 hours at 700° C.

The engine exhaust emissions were modified to reproduce a range of exhaust gas conditions. These variations were achieved by allowing one or more of the following parameters to be changed: EGR rate, pilot injection timing and quantity of fuel injected, main injection timing, common rail fuel pressure and boost pressure of the turbo charger. With these calibration changes it was possible to increase HC and CO levels from the engine.

Both catalysts were evaluated in the European three test cycle with the standard production calibration (Base). They were then evaluated with a calibration which produced CO emissions three times higher than the base calibration. Table 14 summarises the results for both catalysts with both calibrations.

TABLE 14

Results (g/km) with Catalyst A and B for both calibrations.

|  |  | g/km | |
| --- | --- | --- | --- |
|  |  | Catalyst K (Pt) | Catalyst L (Pt + Pd) |
| Base Calibration | Engine Out HC | 0.19 | 0.21 |
|  | Engine Out CO | 1.43 | 1.42 |
|  | Engine Out NOx | 0.38 | 0.38 |
|  | Tailpipe HC | 0.014 | 0.009 |
|  | Tailpipe CO | 0.042 | 0.041 |
|  | Tailpipe NOx | 0.37 | 0.38 |
| High CO Calibration | Engine Out HC | 0.39 | 0.39 |
|  | Engine Out CO | 4.55 | 4.28 |
|  | Engine Out NOx | 0.72 | 0.78 |
|  | Tailpipe HC | 0.122 | 0.08 |
|  | Tailpipe CO | 1.58 | 0.398 |
|  | Tailpipe NOx | 0.73 | 0.77 |

From Table 14 it can be seen that with the Base Calibration the catalysts have very similar performance with regard to CO removal. With the high CO calibration the Catalyst L has much lower tailpipe HC and CO emissions than Catalyst K.

The method used to increase the CO emissions from the engine also resulted in a noticeable increase in $NO_x$. This would not occur in the type of engine designed specifically to operate under conditions which would result in these high CO emissions. However, the results show that the oxidation performance of both catalysts is independent of $NO_x$ concentration. Therefore, using a constant concentration of 200 ppm $NO_x$ in the synthetic gas test had no influence on the results obtained for HC and CO oxidation.

The invention claimed is:

1. A process for operating an apparatus comprising a compression ignition engine configured to operate in a first, normal running mode to produce exhaust gas and in a second mode, wherein when operating in the second mode, the engine produces an exhaust gas comprising an increased level of carbon monoxide (CO) relative to the exhaust gas of the first mode, means when in use to switch engine operation between the two modes and an exhaust system comprising a catalysed component of an oxidation catalyst or a NO oxidation catalyst, wherein when the catalysed component is the NO oxidation catalyst, a filter is located downstream of a catalyst component, and wherein the catalysed component comprises a flow through, non-filtered substrate monolith comprising a palladium (Pd) catalyst supported on a first support material associated with at least one base metal promoter and a platinum (Pt) catalyst associated with the supported Pd catalyst, which process comprising running the engine in the first, normal running mode and switching the engine to the second running mode producing a value of at least one measurable parameter indicative of a condition of the engine is outside a pre-determined range, and wherein the substrate monolith comprises an arrangement of the Pd catalyst and Pt catalyst components selected from the group consisting of:
   (a) a first layer comprising the Pt catalyst and a second layer overlying the first layer, which second layer comprising the supported Pd catalyst and the associated at least one base metal promoter; and
   (b) a Pt catalyst located downstream of the supported Pd catalyst and the associated at least one base metal promoter.

2. The process according to claim 1, wherein the means to switch engine operation between the two modes is in response to at least one of exhaust gas temperature, catalyst bed temperature or, if a filter is present, a need to regenerate the filter.

3. The process according to claim 1, wherein the first support material is selected from the group consisting of alumina, silica-alumina, ceria, magnesia, titania, zirconia, a zeolite and mixtures, composite oxides or mixed oxides of any two or more thereof.

4. A system comprising:
   a compression ignition engine configured to operate in a first, normal running mode to produce exhaust gas and in a second mode, wherein when operating in the second mode, the engine produces an exhaust gas comprising an increased level of carbon monoxide (CO) relative to the exhaust gas produced in the first mode;
   means to switch engine operation between the two modes; and
   an exhaust system disposed downstream of the compression ignition engine for receiving the exhaust gas therefrom, the exhaust system comprising a catalysed component comprising: (1) a flow through, non-filtered substrate monolith comprising a palladium (Pd) catalyst supported on a first support material associated with at least one base metal promoter and (2) a second substrate comprising a filter on which is disposed a first platinum (Pt) catalyst, wherein the substrate monolith is upstream of the filter and the catalysed component is a catalysed soot filter, and the substrate monolith has an arrangement selected from the group consisting of:
   (a) a first layer comprising a second Pt catalyst and a second layer overlying the first layer, which second layer comprising the supported Pd catalyst and the associated at least one base metal promoter;
   (b) a single washcoat layer, which layer comprising the supported Pd, the associated at least one base metal promoter and a second Pt catalyst, wherein the Pd catalyst and the first Pt catalyst are each supported on a separate and distinct particulate support material; and
   (c) a second Pt catalyst located downstream of the supported Pd catalyst and the associated at least one base metal promoter.

5. The system according to claim 4, wherein the means to switch engine operation between the two modes is in response to at least one of exhaust gas temperature, catalyst bed temperature or to regenerate a filter.

6. The system according to claim 4, wherein the substrate monolith further comprises a second platinum (Pt) catalyst.

7. A system comprising:
   a compression ignition engine configured to operate in a first, normal running mode to produce exhaust gas and in a second mode, wherein when operating in the second mode, the engine produces an exhaust gas comprising an increased level of carbon monoxide (CO) relative to the exhaust gas produced in the first mode;
   means to switch engine operation between the two modes; and
   an exhaust system disposed downstream of the compression ignition engine for receiving the exhaust gas therefrom, the exhaust system comprising a catalysed component comprising a flow through, non-filtered substrate monolith comprising a palladium (Pd) catalyst supported on a first support material associated with at least one base metal promoter and a platinum (Pt) catalyst associated with the supported Pd catalyst, wherein the catalysed component is an oxidation catalyst or a NO oxidation catalyst, wherein when the catalysed component is the NO oxidation catalyst, a filter is located downstream of the catalysed component, and wherein the substrate monolith has an arrangement selected from the group consisting of:

(a) a first layer comprising the Pt catalyst and a second layer overlying the first layer, which second layer comprising the supported Pd catalyst and the associated at least one base metal promoter;
(b) a single washcoat layer, which layer comprising the supported Pd catalyst, the associated at least one base metal promoter and the supported Pt catalyst, wherein the Pd catalyst and the Pt catalyst are each supported on a separate and distinct particulate support material; and
(c) a supported Pt catalyst located downstream of the supported Pd catalyst and the associated at least one base metal promoter.

8. The system according to claim 7, wherein the means to switch engine operation between the two modes is in response to at least one of exhaust gas temperature, catalyst bed temperature or, if a filter is present, a need to regenerate the filter.

9. The system according to claim 7, wherein the engine is configured to produce exhaust gas comprising >2000 ppm CO when running in the second mode.

10. The system according to claim 7, further comprising an engine control means, wherein the engine control means comprises an engine control unit (ECU).

11. The system according to claim 7, wherein the means for switching between the two modes switches between the first mode and the second mode when the temperature of the supported Pt catalyst is <250° C.

12. The system according to claim 7, wherein the Pd catalyst and the Pt catalyst are both disposed on the same support material.

13. The system according to claim 7, wherein the at least one base metal promoter is selected from the group consisting of a reducible oxide, a basic metal and mixtures of any two or more thereof.

14. The system according to claim 13, wherein the at least one base metal promoter is the reducible oxide and the reducible oxide is an oxide of a metal selected from the group consisting of manganese, iron, copper, tin, cobalt, cerium and mixtures thereof.

15. The system according to claim 13, wherein the at least one base metal promoter is the reducible oxide and the reducible oxide is selected from the group consisting of $MnO_2$, $Mn_2O_3$, $Fe_2O_3$, $SnO_2$, CuO, CoO, $CeO_2$ and mixtures thereof.

16. The system according to claim 13, wherein the at least one base metal promoter is the reducible oxide and the reducible oxide is dispersed on the first support material.

17. The system according to claim 7, wherein the first support material comprises particulate reducible oxide.

18. The system according to claim 13, wherein the basic metal is selected from the group consisting of
an alkali metal selected from the group consisting of sodium, potassium and caesium,
an alkaline earth metal selected from the group consisting of barium, magnesium, calcium and strontium,
a lanthanide metal selected from the group consisting of cerium, praseodymium and lanthanum, and
mixtures, compound oxides or mixed oxides of any two or more thereof.

19. The system according to claim 7, wherein the first support material is selected from the group consisting of alumina, silica-alumina, ceria, magnesia, titania, zirconia, a zeolite, and mixtures, composite oxides or mixed oxides of any two or more thereof.

20. The system according to claim 7, wherein a supported catalyst part of the catalysed component contains from 0.1 to 30.0% by combined weight of Pt and Pd based on the combined total weight of the supported Pd catalyst and the supported Pt catalyst.

21. The system according to claim 7, wherein a supported catalyst part of the catalysed component contains a weight ratio of from 95:5 to 10:90 Pd:Pt.

22. The system according to claim 7, wherein the engine is a diesel engine.

23. The system according to claim 7, wherein the Pt catalyst is supported on a second support material.

24. The system according to claim 7, wherein the substrate monolith comprises the supported Pd catalyst and the associated at least one base metal promoter on an upstream part of the substrate monolith, and the Pt catalyst is on a downstream part of the substrate monolith.

25. The system according to claim 7, wherein the engine is configured to produce exhaust gas comprising >9000 ppm CO when running in the second mode.

26. The system according to claim 7, wherein the catalysed component comprises from 30 to 300 g/ft³ Pd and from 30 to 300 g/ft³ Pt.

27. The system according to claim 26, wherein the supported catalysts contain from 0.1 to 10% Pt by weight and from 0.1 to 20% Pd by weight based on the combined total weight of the supported catalysts.

* * * * *